Dec. 9, 1952     O. J. ANDERSON     2,620,708
REARVIEW MIRROR AND ADJUSTABLE SUPPORT
Filed April 19, 1949     2 SHEETS—SHEET 1
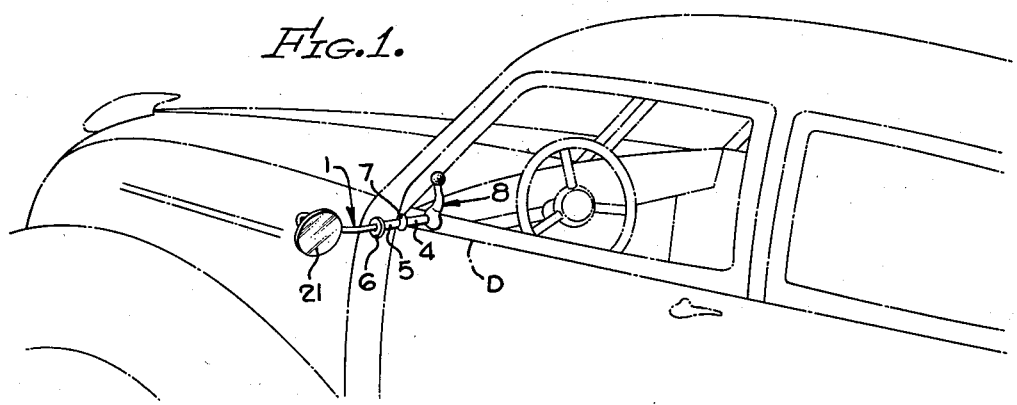
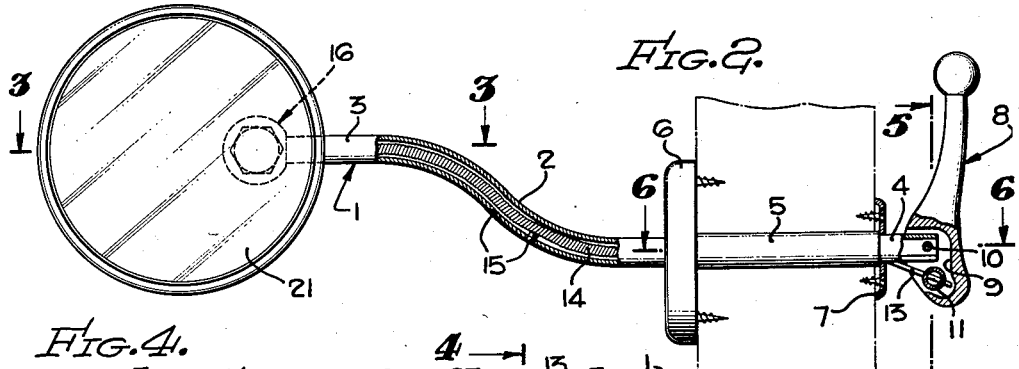
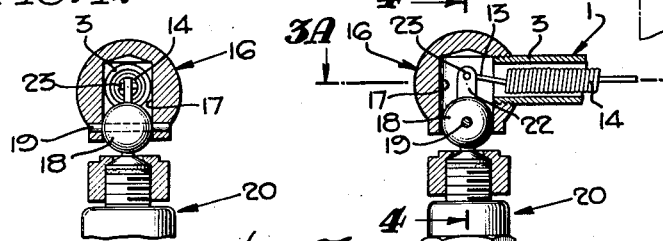
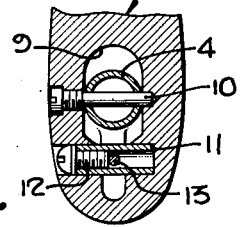
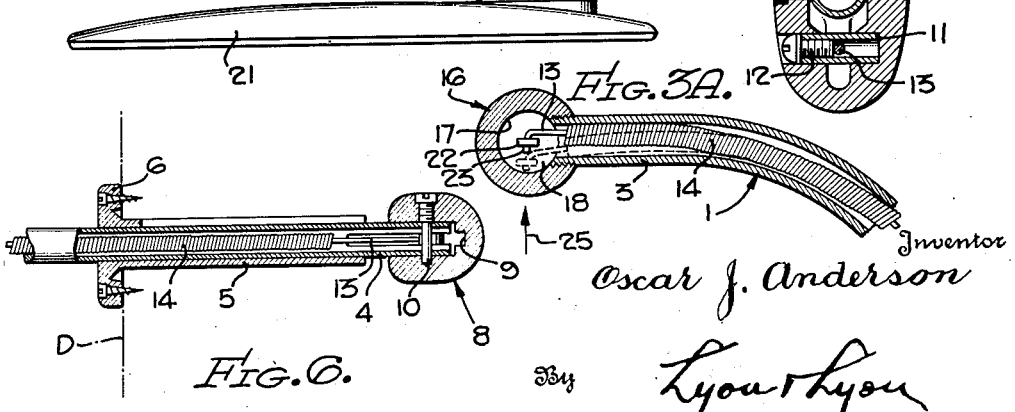
Inventor
Oscar J. Anderson
By Lyon & Lyon
Attorneys

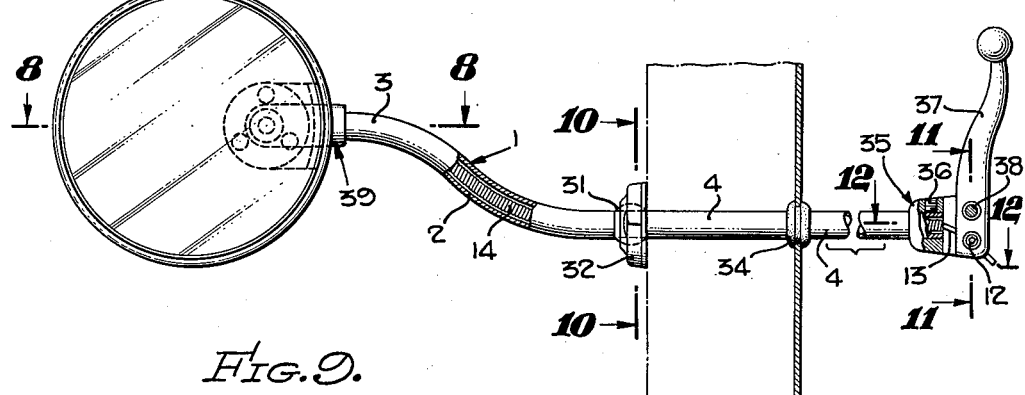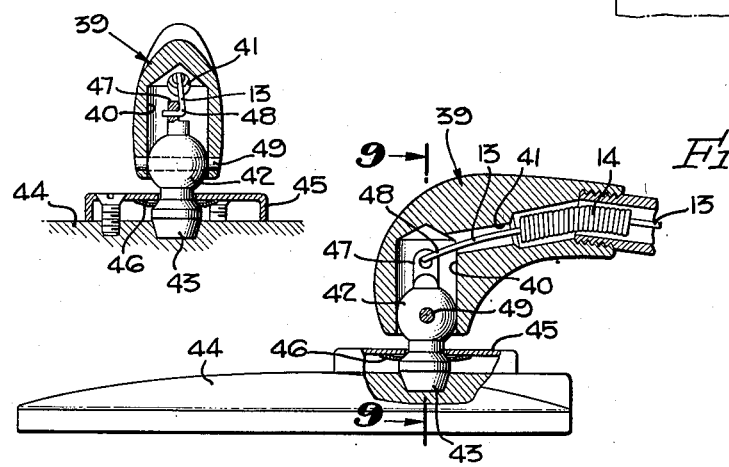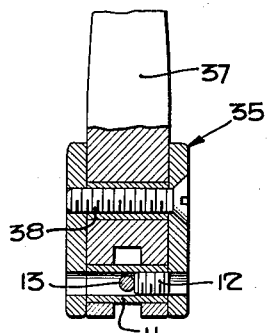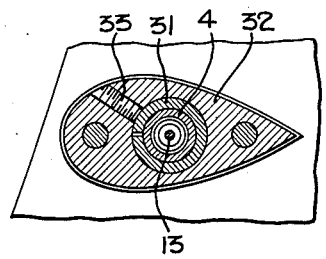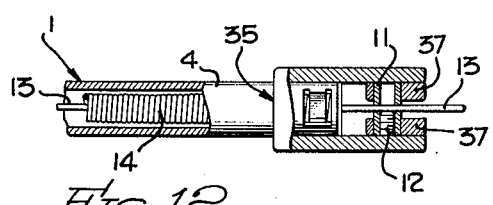

Patented Dec. 9, 1952

2,620,708

UNITED STATES PATENT OFFICE 2,620,708

REARVIEW MIRROR AND ADJUSTABLE SUPPORT

Oscar J. Anderson, Glendale, Calif.

Application April 19, 1949, Serial No. 88,391

7 Claims. (Cl. 88—93)

My invention relates to rear view mirror supports for use on automobiles and other vehicles.

Included in the objects of my invention are:

First, to provide a rear view mirror support which may be tilted or turned from within the driver's compartment by means of a simple control so arranged that such adjustment may be readily effected while the driver is watching traffic and otherwise maintaining the automobile under full control, thus materially reducing the risk and hazard inherent in the conventional rear view mirror which requires the driver to reach forward and extend his arm from the vehicle in order to effect adjustment.

Second, to provide a rear view mirror support that although easily adjusted may be depended upon to maintain its adjusted position.

Third, to provide a rear view mirror support wherein the turning axis of the mirror is displaced laterally from the axis of the tilting handle to facilitate proper location of the mirror to meet all conditions of installation.

With the above and other objects in view which may appear hereinafter, reference is made to the accompanying drawings, in which:

Fig. 1 is a perspective view of my mirror support as it appears on a vehicle, the vehicle being indicated fragmentarily and by dotted lines.

Fig. 2 is an enlarged elevational view of my rear view mirror support with portions shown in section, to facilitate the illustration.

Fig. 3 is the further enlarged sectional view through 3—3 of Fig. 2, illustrating the manner in which the mirror is connected to the support, the mirror being shown in elevation.

Fig. 3A is a fragmentary sectional view through 3A—3A of Fig. 3 with the mirror mounting removed.

Fig. 4 is a fragmentary sectional view through 4—4 of Fig. 3.

Fig. 5 is an enlarged fragmentary sectional view of the operation handle taken through 5—5 of Fig. 2.

Fig. 6 is a fragmentary longitudinal sectional view taken through 6—6 of Fig. 2.

Fig. 7 is a view similar to Fig. 2, showing a modified form of my rear view mirror support.

Fig. 8 is a fragmentary partial sectional, partial elevational view thereof, taken through 8—8 of Fig. 7.

Fig. 9 is a fragmentary sectional view through 9—9 of Fig. 8.

Fig. 10 is a sectional view of the escutcheon structure taken through 10—10 of Fig. 7.

Fig. 11 is a fragmentary sectional view of the handle taken through 11—11 of Fig. 7.

Fig. 12 is a fragmentary sectional view taken through 12—12 of Fig. 7.

Reference is first directed to Figures 1 through 6. A tubular support 1 is provided. An S bend 2 is formed in the intermediate portion of the support 1 so as to form an extended end 3 and a journaled end 4, which are substantially parallel but displaced laterally from each other. The journaled end 4 fits within a journal tube 5 split along one side so to provide a frictional grip. The journal tube 5 is adapted to be mounted in the door D of a vehicle and is held between mounting plates 6 and 7. The end 4 protrudes within the vehicle and supports a lever 8.

The lever 8 is provided with a cavity 9 which receives the end of the tube and a cross pin 10 is threaded into the handle lever 8 and across the tube. Below the tube the handle lever is provided with a clamp which comprises a small crosswise perforated tube 11 and set screw 12, so arranged as to grip a control wire 13. The control wire is threaded through a flexible cable 14 in the form of a closed wound coil. The flexible cable in turn is threaded through the tubular support 1. A set screw 15 extends through the wall of the tubular support 1 for engaging and securing the flexible cable.

The outer or extended end 3 of the tubular support receives a head member 16 having a socket 17 therein, at right angles to the tubular support. The outer portion of the socket 17 journals a ball 18 which is retained by a cross pin 19. The ball 18 forms a part of a mirror mounting assembly 20 which is attached eccentrically to a mirror 21 so that the mirror can be rotated about the axis of the assembly. A short lever arm 22 extends from the ball 18 into the socket 17 and is provided with an aperture which receives and journals a hooked end 23 of the control wire 13. As shown in Fig. 3A, the flexible cable 14 is smaller than the bore of the tube 2 and thus, by reason of the adjacent bend in the tube, bears upwardly, yieldably displacing upwardly the hood end 23 of the control wire. Thus, when in engagement with the lever arm the control wire and cable exert a force or torque in the direction of the arrow 25 in Figures 3A and 4, placing a biasing strain on the pin 19 which tends to counteract vibration without interference with pivotal movement.

Operation of my rear view mirror support, as shown in Figures 1 to 6, is as follows:

The vehicle door or vehicle frame is drilled at the appropriate point to receive the journal tube 5. The journal tube is mounted, the end 4 of the tubular support 1 is inserted, and the handle lever 8 attached. The connection between the extended end of the tubular support and mirror may be factory assembled. By reason of the offset relation of the portions 3 and 4, the position of the mirror may be raised or lowered until the proper height for vision is reached. Also the mirror may be turned on the axis of the mounting assembly 20. In addition said assembly may incorporate its own universal adjustment so that the mirror may be tilted with respect to the support. These various adjustments enable the mirror to be placed in the most optimum position. In use, the handle 8 may be moved about the axis of the pin 10 to turn the mirror about a vertical axis to bring the desired region in view. Also the tubular support may be rotated by the handle about the axis of the journaled end 4 so that the altitude of the region viewed may be altered. It will be appreciated that this latter movement need involve only a few degrees of rotation.

Reference is now directed to the structure in Figures 7 to 12 inclusive. This construction also involves a tubular support 1 having an S bend 2 and substantially parallel, that is, laterally offset ends 3 and 4. In this case, the journaled end 4 is provided with a ball ferrule 31 preferably split so that it may grip the tubular support. The ball ferrule is adjustably mounted in an appropriate socket provided in a mounting plate 32 adapted for attachment to the exterior of a vehicle door. Once in position, the ferrule is secured by set screw 33. The journaled end protrudes through the vehicle door and is provided with a grommet 34 which fits in the aperture in the door through which the journaled end extends. Screwed to the extremity of the journaled end 4 is a handle yoke 35 having a collar portion in which fits a set screw 36 engageable with the end 4. The yoke includes a pair of arms which fit on opposite sides of a handle 37, a journal pin 38 joins the yoke and the handle so that the handle may have limited pivotal movement. The handle is equipped with a clamp involving the tube 11 and set screw 12 shown in the first described structure. The clamp grips a control wire 13, fitted in a flexible cable 14, which in turn is threaded through the support 1.

The extended end 3 of the support 1 receives a head member 39 of generally L form. The head is provided with a socket 40 disposed at somewhat less than right angles to the extended end 3 and a bore 41 communicating between the socket 40 and the interior of the tubular support 1. The socket 41 journals a ball lever 42 having an extended end 43 which is fitted in a mirror backing member 44 and frictionally held by a retainer plate 45 and tension spring 46. The ball lever 42 is provided with a stem 47 extending into the socket 40. The extremity of the stem is perforated to receive the hooked end 48 of the control wire 13. It will be noted that the point of connection between the hook end 48 and the stem 47 is such that the control wire is sprung laterally so that a biasing strain is exerted by the control wire and tends to draw the stem 47 into the socket 40, placing a lateral load on the pin 49 tending to resist vibration.

The ball lever 42 is limited to one axis of rotation by means of a pivot pin 49. The operation of the structure shown in Figures 7 to 12 inclusive is essentially the same as that shown in the first described structure.

It will be observed that the S curve of the support 1 and the flexible cable sheath 14 therein introduces frictional resistance to movement of the control wire to dampen out any vibration.

Having fully described my invention, it is to be understood that I do not wish to be limited to the details herein set forth, but my invention is of the full scope of the appended claims.

I claim:

1. In a rear view mirror mountable on a vehicle body, the combination with a support extending through the body, of a tubular S-shaped arm seated in and outwardly projecting from said support, said arm terminating at the outer end thereof in a head, a resilient housing extending through the support and arm, a lever pivotally mounted in said head and including an inner end, and an outer end, a mirror secured to the outer end of said lever, a resilient member extending through said housing and terminating at one end thereof in means engaging the inner end of said lever, and manually operable means for moving said member longitudinally within the housing to rock said mirror lever on its pivot, the curvature of the arm maintaining said housing and member under lateral tension exerting lateral pressure against the inner end of the lever in a direction to place a biasing load on the lever pivot thereby to resist rocking movement of the lever on its pivot and to check freedom of vibration thereof.

2. In a rear view mirror mountable on a vehicle body, a tubular S-shaped arm mounted in and outwardly extending from the vehicle body, said arm terminating at the outer end thereof in a head, a helically wound flexible cable extending through the arm, a mirror support lever pivotally mounted in said head, said lever including an inner end and an outer end, a mirror secured to the outer end of said lever, a flexible wire extending through said cable and terminating in means engaging the inner end of said lever, and a handle connected to move said flexible wire longitudinally within the cable to rock the mirror lever on its pivot, the curvature of the arm maintaining said cable and flexible wire under tension to exert pressure against the inner end of said lever in a direction to place a biasing load on the lever pivot thereby to resist rocking movement thereof and to check freedom of vibration thereof.

3. In a rear view mirror mounted on a vehicle body, the combination with a support extending through the body, of a tubular S-shaped arm seated in and outwardly extending from said support, said arm terminating at the outer end thereof in a head, a handle on the inner end of the arm, a spring housing extending through the arm, a mirror support lever pivotally mounted in said head, said lever including an inner end and an outer end, a mirror secured to the outer end of said lever, and a resilient member seated within said housing for axial movement therein in response to manual operation of said handle and terminating at the outer end thereof in means engaging the inner end of said lever, the curvature of the arm maintaining said housing and member under lateral tension exerting pressure against the inner end of the lever in a direction to place a biasing strain on the lever pivot thereby to resist rocking movement thereof and to check freedom of vibration thereof.

4. In a rear view mirror mountable on a vehicle body, the combination with a support extending through the body, of a tubular S-shaped arm seated in and outwardly projecting from said support, said arm terminating at the outer end thereof in a head, a resilient housing extending through the arm, a mirror support lever pivotally mounted in said head, said lever including an inner end and an outer end, a mirror secured to the outer end of said lever, a resilient member extending through said housing and terminating in means engaging the inner end of said lever, and a handle connected to move said member longitudinally within the housing to rock said mirror support lever on its pivot, the curvature of the arm maintaining said housing and member under lateral tension to exert pressure against the inner end of said lever in a direction to place a biasing strain on the pivotal axis thereof to resist movement of the lever on its pivot and to check freedom of vibration, and means for locking said resilient housing against longitudinal displacement within the arms.

5. A rear view mirror structure, comprising: a rigid tubular support having an S-curved intermediate portion and laterally displaced end portions; a mirror pivotally connected to one of said end portions for movement about an axis transverse thereto; journal means for the other of said end portions permitting movement of said mirror and first end portion about the journal axis of said other end portion; a flexible element threaded through said support and connected to said mirror to effect movement about its pivotal connection with said first end portion; and a control means connected to said other end portion and to said element movable to turn said other end portion and to reciprocate said element.

6. A rear view mirror structure, comprising: a rigid tubular support having an S-curved intermediate portion and a laterally disposed journal end and extended end; means for mounting said journal end for rotation about its axis, said means involving a mounting plate having a spherical seat, a split ball member fitting said seat and bored to receive the journal end of said tubular support; a mirror supporting lever mounted at the extended end of said tubular support for movement about an axis substantially perpendicular to the journal end of said tubular support; a mirror secured to said lever; a flexible element threaded through said tubular support and attached to said lever; a handle means secured to said journal end and to said flexible element and capable of compound movement to effect pivotal movement of said lever about its axis and planetary movement about the axis of said journal end.

7. A rear view mirror structure, comprising: a rigid tubular support having an S-curved intermediate portion and a laterally disposed journal end and extended end; means for mounting said journal end for rotation about its axis; a mirror supporting lever mounted at the extended end of said tubular support for movement about an axis substantially perpendicular to said journal end of said tubular support; a mirror secured to the lever; a flexible element threaded through said tubular support and attached to said lever; a handle means secured to said journal end and to said flexible element and capable of compound movement to effect pivotal movement of said lever about its axis and planetary movement about the axis of said journal end.

OSCAR J. ANDERSON.

REFERENCES CITED

The following references are of record in the file of this patent:

UNITED STATES PATENTS

| Number | Name | Date |
| --- | --- | --- |
| 1,193,894 | Harvey | Aug. 8, 1916 |
| 1,390,350 | Evans | Sept. 13, 1921 |
| 1,445,829 | Fischer | Feb. 20, 1923 |
| 1,913,874 | Folberth et al. | June 13, 1933 |
| 2,260,597 | Beattie | Oct. 28, 1941 |
| 2,315,260 | Lancaster | Mar. 30, 1943 |
| 2,326,316 | Allen | Aug. 10, 1943 |
| 2,341,208 | Clark et al. | Feb. 8, 1944 |
| 2,456,362 | Aves | Dec. 14, 1948 |